United States Patent [19]

Varnum, Sr. et al.

[11] Patent Number: 5,730,455
[45] Date of Patent: Mar. 24, 1998

[54] LOG TRAILER SUPPORT

[76] Inventors: Robert R. Varnum, Sr., Rte. 1, Box 1314, Simms, Tex. 75574; George L. May, Rte. 1, Box 154C, DeKalb, Tex. 75559

[21] Appl. No.: 661,739

[22] Filed: Jun. 11, 1996

[51] Int. Cl.⁶ .................................................. B60S 9/02
[52] U.S. Cl. ........................ 280/475; 280/404; 280/763.1
[58] Field of Search ........................... 280/404, 405.1, 280/407.1, 475, 763.1, 766.1, 79.6, 304; 248/125.8, 352, 354.1–354.7, 357; 254/418, 419, 420

[56] References Cited

U.S. PATENT DOCUMENTS

| | | | |
|---|---|---|---|
| 2,177,677 | 10/1939 | Staben | 248/188.9 |
| 2,733,330 | 1/1956 | Blewett | 248/354.4 |
| 2,857,212 | 10/1958 | Everitt | 280/405.1 |
| 3,229,940 | 1/1966 | Kagels | 248/354.5 |
| 3,315,973 | 4/1967 | Marple | 280/763.1 |
| 3,439,934 | 4/1969 | Murie et al. | 280/404 |
| 3,521,902 | 7/1970 | Akers | 280/763.1 |
| 3,545,635 | 12/1970 | Montan | 280/404 |
| 3,904,224 | 9/1975 | Belke | 280/763.1 |
| 4,268,051 | 5/1981 | Skirvin et al. | 280/404 |
| 4,384,699 | 5/1983 | Berger | 248/357 |
| 4,461,491 | 7/1984 | Eklund | 280/763.1 |
| 4,938,524 | 7/1990 | Straub et al. | 280/799 |
| 4,966,383 | 10/1990 | Sjostrom | 280/404 |
| 5,110,149 | 5/1992 | Dahlstrom | 280/401 |
| 5,127,663 | 7/1992 | Whitehead | 280/404 |
| 5,322,314 | 6/1994 | Blum | 280/423.1 |

FOREIGN PATENT DOCUMENTS

| | | |
|---|---|---|
| 312815 | 4/1989 | European Pat. Off. |
| 202279 | 2/1966 | Sweden |

*Primary Examiner*—Anne Marie Boehler
*Attorney, Agent, or Firm*—Richard C. Litman

[57] ABSTRACT

A support for the forward end of a log trailer serves to hold the fifth wheel hitch plate of the trailer clear of the ground, thus obviating the need to clean and regrease the plate before each occasion the trailer is hitched to a truck tractor for towing. Such log trailers have articulated booms, which allow them to be folded for transport on the back of a truck tractor. The forward hinge at the hitch plate fails to provide rigidity for the structure when the empty trailer is unhitched, however, thus allowing the hitch plate to fall to the ground unless otherwise supported. The present support comprises a pair of stands having horizontal support members which removably engage mating receptacles affixed to the forward log bunk of the trailer, to which the hitch plate is also affixed. The support members and receptacles preclude rotation of the receptacles, and thus the log bunk and hitch, about the support members, thus keeping the hitch plate and attached structure upright. The telescoping support members allow the space between the stands to be adjusted for different truck tractors, and the height of the horizontal support members is also adjustable for different truck tractors as well. Before an empty trailer is unhitched from its truck tractor, the stands are installed to either side of the rear wheels of the tractor, to support the trailer. The tractor is unhitched and driven clear, with the trailer remaining upright and supported by the stands.

8 Claims, 3 Drawing Sheets

LOG TRAILER SUPPORT

BACKGROUND OF THE INVENTION

1. Field of the Invention

The present invention relates generally to racks, stands, and supports, and more particularly to support means for an articulated log or pole trailer. The support means comprises a pair of stands which are removably securable to a corresponding pair of sockets permanently secured to either side of the front crossmember or log bunk. The stands serve to hold the articulated bunk or crossmember and its attached fifth wheel hitch plate, upright and clear of the underlying surface, thereby keeping the hitch plate clean and precluding need to clean and regrease the plate after contact with the ground. The stands are spaced apart sufficiently to allow a truck tractor to back under the raised log bunk end of the trailer to hook up the fifth wheel hitch plate for towing the trailer.

2. Description of the Prior Art

Logs, poles, and other elongate objects are often transported over the road by means of specialized log trailers towed by truck tractors with a fifth wheel type hitch. These log trailers are articulated, having a central boom or backbone which is hinged, so the entire trailer, including the rear wheels, may be folded forwardly and upwardly to be carried on the back of the truck tractor with the fifth wheel hitch remaining attached to the truck.

This configuration requires the trailer hitch portion, and its attached forward log bunk, to be articulated to the trailer boom so the hitch may retain the proper orientation. Unfortunately, this articulation of the hitch portion also means that there can be no provision for forwardly mounted support wheels near the forward end of the boom and back of the hitch, as is almost universally provided on other large trailers. Such a support dolly would interfere with the folding of an empty log trailer for placement on the back of the truck tractor for transport.

As a result, the usual procedure is for an empty trailer which is being unhitched from its tractor, to be extended and to allow the fifth wheel hitch plate to drop to the ground. These hitch plates bear directly upon the cooperating plate on the tractor when the trailer is being towed, and hence are greased regularly to reduce friction between the two surfaces bearing against one another. When this greased fifth wheel hitch surface of the trailer is dropped to the ground, it of course picks up gravel, sand, dirt, etc. in the grease, and must be cleaned and regreased before the trailer can be hitched up again to the tractor.

To the present, log trailer operators have accepted this inconvenience as a part of their operations. As can be seen, some means of supporting the fifth wheel hitch end of an empty log trailer when it is disconnected from a truck tractor, would be of great value to such operators. Yet, the prior art of which applicants are aware reveals no such log trailer support, as will be discussed in detail below.

U.S. Pat. No. 4,268,051 issued to Paul G. Skirvin et al. on May 19, 1981 describes Log Bunk Structures wherein a plurality of roller bearings are installed between the log bunk and an underlying crossmember, to allow the two components to rotate relative to one another. No means is disclosed to support the fifth wheel hitch of the trailer above the underlying surface, when the trailer is disconnected from a towing tractor.

U.S. Pat. No. 4,938,524 issued to Gerald J. Straub et al. on Jul. 3, 1990 describes a Semi-Truck Trailer Gooseneck And Curtain Side Improvements. One of the embodiments is directed toward providing additional support at the forward or "gooseneck" end of the trailer, i.e., near the hitch, so the underlying floor support girders of the trailer may be made shallower for additional volume within the trailer. While FIGS. 1 and 3 disclose telescoping trailer support legs, these are conventional and remain attached to the trailer at all times. Thus, they are not adaptable to an articulated log trailer, with its folding structure.

U. S. Pat. No. 4,966,383 issued to Harold Sjostrom on Oct. 30, 1990 describes a Logging Trailer having a three axle extended rear support. The forward end of the trailer, and its bunk and hitch means, is conventional. No disclosure is made of any means for supporting the front of the trailer when it is unhitched from the towing tractor, as provided by the present invention.

U.S. Pat. No. 5,110,149 issued to Gale E. Dahlstrom on May 5, 1992 describes a Trailer System Design For Enhanced Load-Carrying Capacity And Maneuverability. Basically, a rearwardly disposed fourth axle is provided for additional weight bearing capacity at the rearwardmost end of the trailer. Dahlstrom also discloses a somewhat different means of carrying the rear portion of the trailer on the back of the tractor, when the trailer is empty. However, no forward support for the trailer is disclosed, to prevent the fifth wheel trailer hitch from resting on the ground, as provided by the present invention.

U. S. Pat. No. 5,127,663 issued to Jerald M. Whitehead on Jul. 7, 1992 describes a Tandem Trailer Truck For Transporting Elongate Objects. The entire tractor and trailer assembly are specially constructed to work with one another; the two trailer portions cannot be used with a conventional tractor. The trailers use pintle type hitches, rather than a fifth wheel type, as in conventional log trailers to which the present invention is directed. The only fifth wheel type hitch disclosed in the Whitehead patent is for the forwardmost log bunk, which is not a part of either of the trailers, but is only secured to the frame of the truck tractor by means of the cooperating fifth wheel hitch components. The tractor is unsuited for towing any type of fifth wheel hitch type trailer with its hitch, as the frame of the truck extends too far rearwardly in order to accommodate the pintle hitch of the first trailer.

U.S. Pat. No. 5,322,314 issued to Louis F. Blum on Jun. 21, 1994 describes a Thin Gooseneck Assembly adapted for the same purpose as the Straub et al. trailer discussed further above, although being somewhat different in structure. Both the Straub and Blum trailers have relatively wide, flat, weight bearing floors, which have sufficient width to provide for the installation of a forward trailer support stand thereto. These trailers do not articulate, and the fifth wheel hitch portion of the forwardmost end or gooseneck portion thereof, also does not articulate. Thus, conventional telescoping or folding stands may be used, which remain with the trailer at all times, unlike the present stands which are adapted for removal to allow the trailer to be folded.

Swedish Patent Publication No. 202,279 to E. B. Goransson published on Feb. 22, 1966 describes a hitch arrangement for a sled type device adapted to be towed behind an agricultural tractor or the like. While the device may be disassembled, it does not articulate, and the hitch means comprises a bolted arrangement, rather than a fifth wheel apparatus. In any case, no support means for the unhitched forward end of the device is disclosed.

Finally, European Patent Publication No. 312,815 to Doll Fahrzeugbau published on Apr. 26, 1989 describes a transporter for elongate articles, having separately controlled steering means for the separate front and rear wheel assemblies of the trailer. No support for the free forward end of the trailer is disclosed.

None of the above inventions and patents, either singly or in combination, is seen to describe the instant invention as claimed.

SUMMARY OF THE INVENTION

Accordingly, it is a principal object of the invention to provide an improved support for the forward end of an articulated log or pole trailer, with the support adapted to hold the trailer hitch above the ground and to provide for the convenient hitching of the trailer to a truck tractor for towing.

It is another object of the invention to provide an improved log trailer support which is adjustable both vertically and laterally, to accommodate different truck tractors.

It is a further object of the invention to provide an improved log trailer support which comprises a pair of stands removably engageable from a corresponding pair of receptacles, which receptacles are permanently secured to the forward log bunk of the log trailer.

An additional object of the invention is to provide an improved log trailer support which stands may be immovably secured in place to the trailer as desired, for greater security.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention will be seen to comprise a log trailer support, including a pair of identical stands 10. Generally speaking, log trailers, such as the conventional log trailer 12 used with the present invention, require very little structure, as the logs or other elongate articles they are adapted to carry (poles, etc.) have sufficient longitudinal strength to be self supporting. Accordingly, such trailers 12 are generally constructed with a single articulated backbone structure 14, which includes two different hinge points to allow the trailer 12 to be folded onto the back of a truck tractor for transport when empty, rather than towed on its own wheels on the ground.

Figure 2:
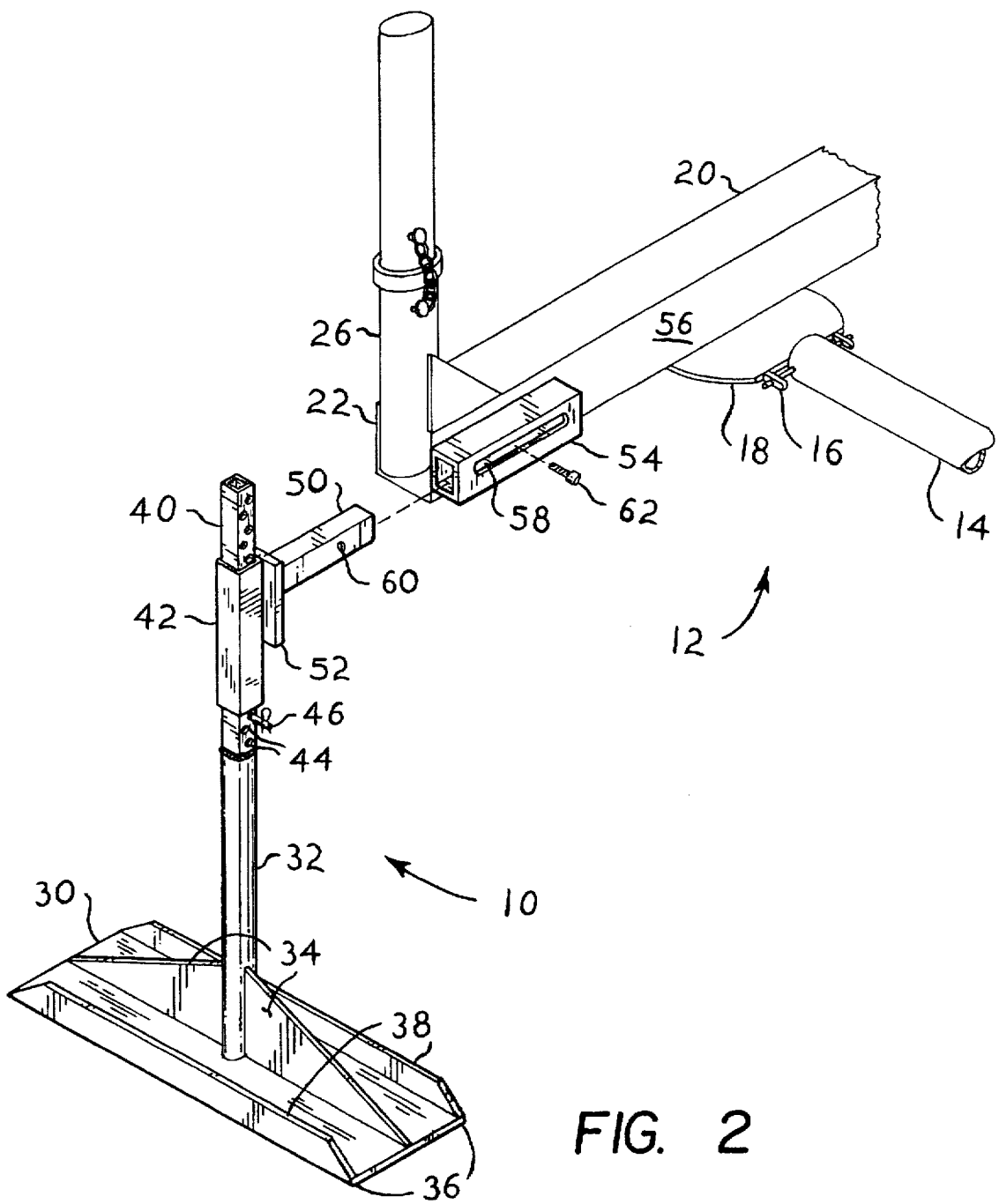
FIG. 2 is a left rear perspective view of the left stand portion removed from its receptacle on the trailer log bunk, and the means for adjustably securing the stand in place.

One hinge point (not shown) is generally located at about the center of the boom 14 with a forward hinge 16 located immediately behind the fifth wheel hitch plate 18 of the trailer 12, as shown in FIG. 2. A transverse member or log bunk 20 is affixed across the hitch plate 18, to serve as a forward support for logs or other elongate articles carried on the trailer 12. The bunk 20 has a left end 22 and an opposite right end 24, with each end 22/24 having a retaining post, respectively 26/28, extending therefrom and generally normal to the plane of the hitch plate 18.

This construction permits the hitch plate 18 to remain hitched to the mating fifth wheel hitch of a truck tractor, with the forward part of the boom 14 being folded upwardly and forwardly over the back of the truck tractor, and the rearward part of the boom 14 and the rear wheel and axle assembly (not shown) remaining close to horizontal, but being drawn up over the forward portion of the trailer 12. The above described trailer 12, and method of moving the empty trailer, is conventional and known in the art.

It will be seen that the above described configuration fails to provide any suitable point for a conventional forward support dolly, landing gear, etc., serving to hold the hitch plate off the ground. While a support could be provided at the forward portion of the boom 14, this would still allow the hitch plate 18 to fold aft due to the weight of the posts 26/28. No inboard support may be provided at the hitch plate 18 itself, as there would be no clearance for the truck tractor. Accordingly, the hitch 18 is often allowed to drop to the ground, with no support being provided.

Figure 1:
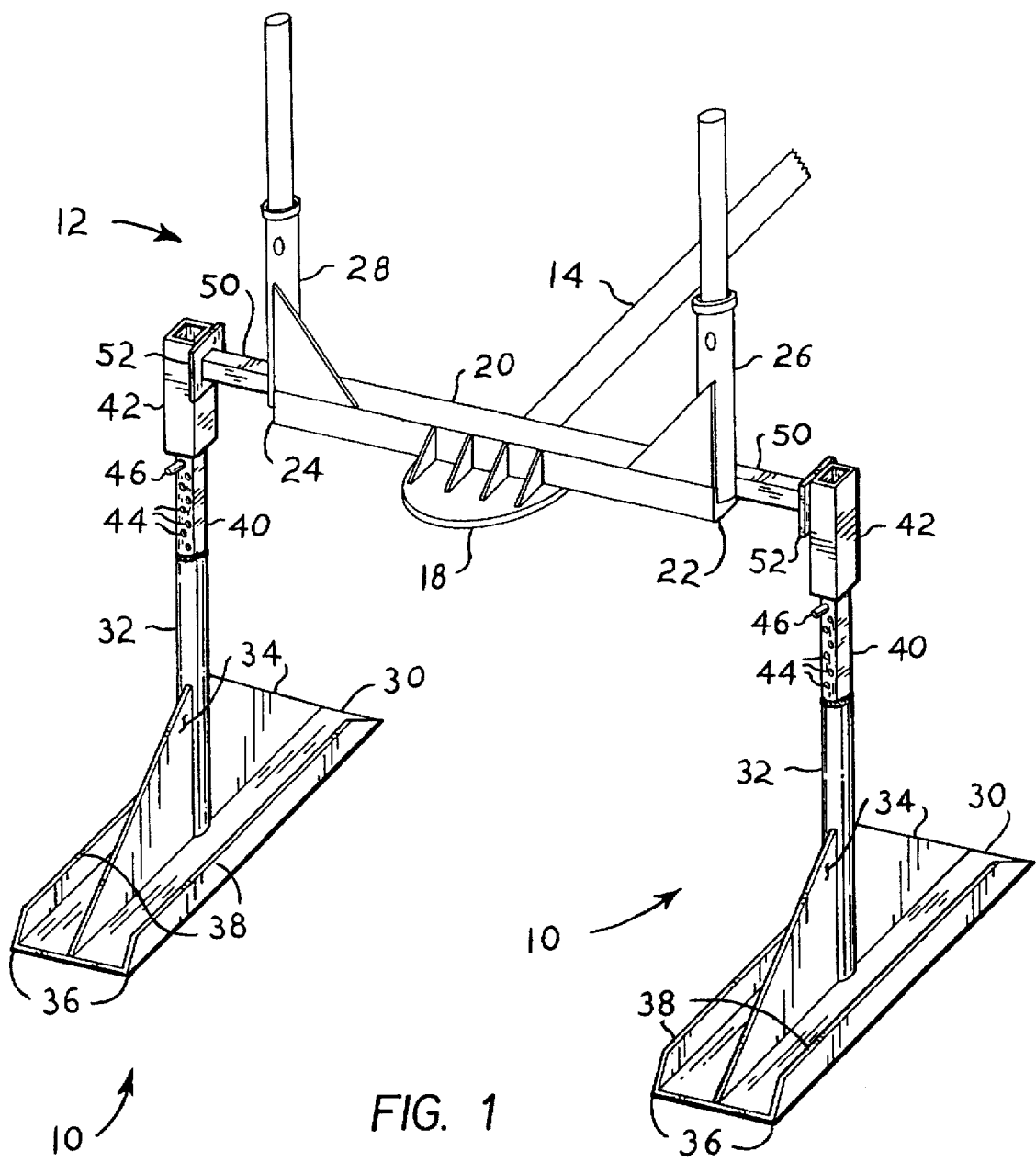
FIG. 1 is a left front environmental perspective view of the present log trailer stand, showing the left and right stand components supporting the forward end of an articulated log trailer and its fifth wheel hitch plate.

Fifth wheel trailer hitches, such as the hitch 18 shown in FIGS. 1 and 2, must be clean and require good lubrication between the trailer and tractor components of the hitch. Whenever such a trailer hitch plate 18 is dropped to the ground, the greasy surface picks up gravel, dirt, mud, etc., particularly in the wooded environment generally encountered when such log trailers 12 are loaded. As a result, the truck driver must take the time to wipe down the trailer hitch plate 18, and to relubricate the plate 18 with fresh grease. This is obviously time consuming and wasteful, while heavy duty steel sawhorses are sometimes used to hold the hitch plate 18 clear of the ground, these still allow the hitch plate 18 to pivot about the boom 14, due to the weight of the retainers 26/28.

The present invention responds to this need with a trailer support comprising two identical stands 10, as noted further above. Each of the stands 10 includes a relatively wide and flat base plate 30, from which a support column lower portion 32 extends upwardly from the general center of and normal to the base plate 30. Additional structural strength may be provided by a pair of gussets 34 disposed to opposite sides of the lower column 32, and the base plate may be formed as a wide, generally U-shaped channel, with each edge 36 of the plate 30 having a flange 38 extending upwardly therefrom. The flanges 38 may have their ends beveled to reduce any tripping hazard. The lower column 32 is preferably formed of cylindrical heavy pipe stock. Drill stem material has been found to work well in supporting an unladen log trailer.

Each lower column 32 has an upper portion 40 extending upwardly therefrom, comprising a length of rectangular or square external section heavy walled steel tubing or pipe. A mating support sleeve 42 of slightly larger similar internal section is adapted to telescope over the support column upper portion 40, with a series of staggered adjustment holes 44 being provided through the column upper portion 40. Thus, the height of the sleeve 42 relative to the lower column 32 and its upper portion 40 may be adjustably fixed, by means of a stop pin 46 as shown in FIGS. 1 and 2. A seal 48

Figure 3:
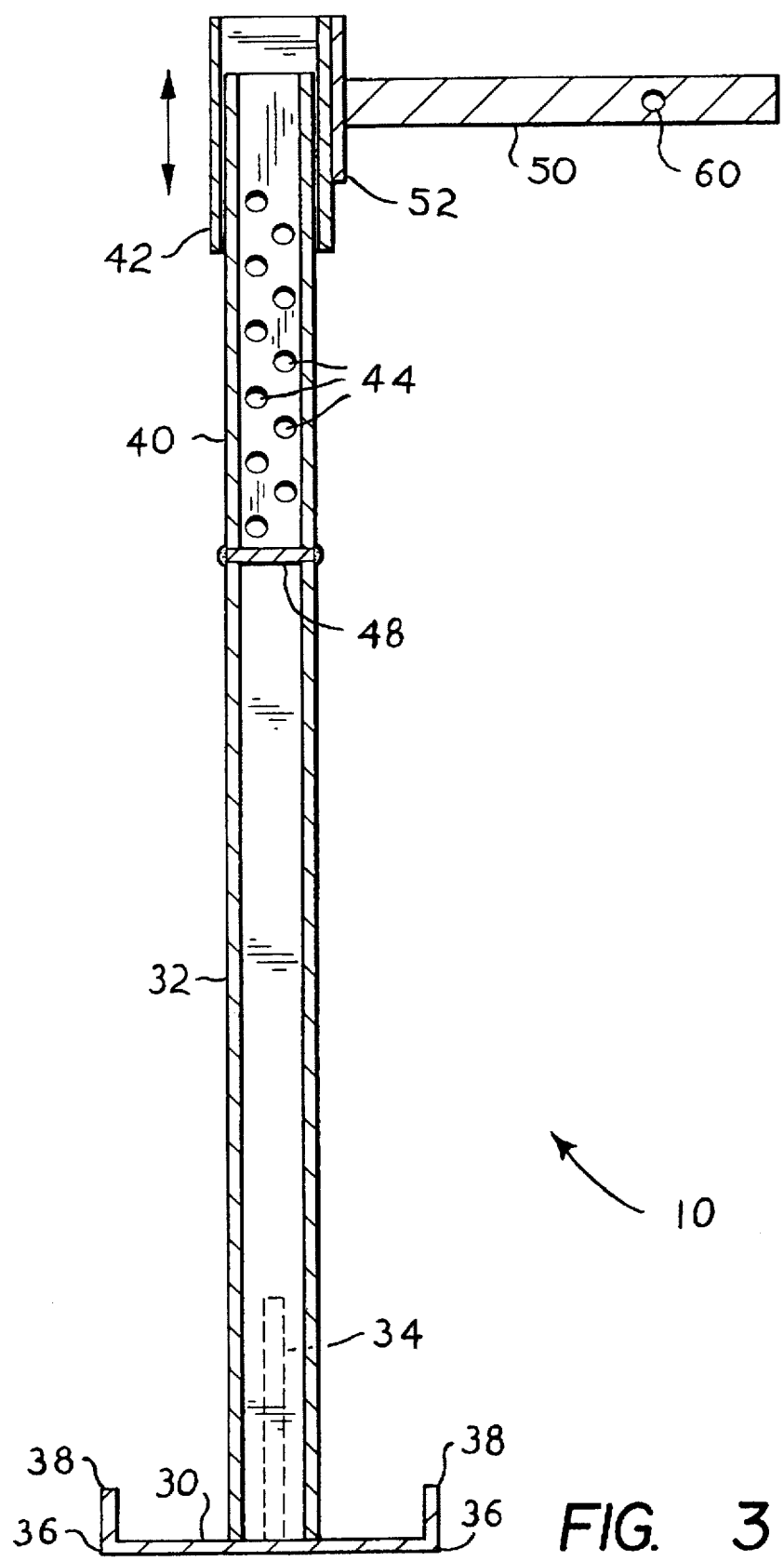
FIG. 3 is an elevation view in section of one of the stand components of the present invention, showing further details of its construction and the vertical adjustment means.

(welded disc or plate, etc.) is provided between the lower column 32 and upper column portion 40, as shown in FIG. 3, to preclude the entry of water or other foreign matter into the lower column portion 32, and the possibility of the lower column 32 splitting due to trapped water freezing therein.

The sleeve 42 provides for the adjustable attachment of a lateral support member 50 to the support column components 32 and 40. Each support member 50 of the two identical left and right stands 10 must support half the weight of the front end of an unladen log trailer 12, and not bend or otherwise deform under such a load. A length of solid rectangular section bar stock has been found to be satisfactory for use as a support member 50. In order to accommodate the heat developed when welding such heavy material to the relatively thinner wall of the adjustment sleeve 42, and to provide a stronger weld, a reinforcement plate 52 may be sandwiched between the support 50 and sleeve 42. The plate 52 is first welded to the bar 50, with the assembly then being welded to sleeve 42.

A mating support member receptacle 54 is welded or otherwise horizontally affixed to the rear surface 56 of the bunk crossmember 20, with the outboard ends of the left and right receptacles 54 immediately adjacent the two ends 22 and 24 of the bunk 20. The left hand receptacle 54 is shown in FIG. 2 installed on the left end 22 of the bunk 20, with it being understood that the right side installation is a mirror image. The receptacles 54 are each of a heavy walled rectangular section stock, having internal dimensions closely fitting and mating with the exterior dimensions of the lateral support members 50. The mating rectangular sections of the support member 50 and receptacle 54 serve to preclude relative rotation between the two, and thus prevent any relative rotation between the stands 10 and hitch, bunk, and upright assembly 18/20/26/28, in order to hold the hitch plate 18 in a generally horizontal position for ease of hitching or unhitching to or from a truck tractor.

Security for the installed stands is provided by slots 58 in the receptacles 54, and a threaded passage 60 formed in the rearwardly facing side of each of the lateral support members 50, which passage is aligned with the slot 58 in the receptacle 54 when each stand 10 is installed. A mating threaded bolt 62 or other suitable fastener may be used to clamp or lock the support member 50 within the receptacle 54, thus preventing any inadvertent dislodging of the support member 50 (and thus the entire stand 10) from the receptacle 54 (and thus the trailer 12) in the event the trailer 12 is accidentally bumped or otherwise moved.

The above described construction provides stands 10 which are easy to weld up from standard steel stock, and which are durable, yet are sufficiently light to be carried and positioned by a single individual. The present stands 10 are used for the support of an unladen conventional log trailer 12 equipped with the appropriate support member receptacles 54, to provide two benefits: (1) support of the hitch plate 18 above the surface, thereby keeping the plate 18 clean and obviating any need for cleaning and regreasing prior to hitching the trailer to a truck tractor, and (2) holding the plate 18 in a generally horizontal orientation, thereby easing the hitching of a truck tractor to the trailer 12.

Once a trailer has been unloaded, the present stands 10 may be used to support the trailer 12, by positioning a left and a right stand 10 adjacent support member receptacles 54 secured to the rear face 56 of the forward bunk 20 of the trailer 12, with the lateral support members 50 each facing toward the bunk 20. The height of the lateral supports 50 are then adjusted to align with the support receptacles 54 on each end of the bunk 20, and inserted therein by maneuvering the stands 10 toward the trailer 12. The locking bolt 62 may be used to secure the support member 50, and thus the entire stand 10, to each side of the trailer 12. The slot 58 in each receptacle 54 provides lateral adjustment for different sized truck tractors. The truck tractor may then be unhitched from the trailer 12, with the mating square sections of the support member 50 and receptacle 54 serving to maintain the hitch plate 18 orientation for ease of hitching for the next movement of the trailer.

When the trailer is to be moved again, the hitch plate 18 will be positioned at very close to the required height, and due to its support during the entire time the trailer 12 was unhitched, will need no further maintenance before connection to the tractor. The truck tractor need only be backed between the two supports 10, with no other preparation required. The locking bolts 62 used to secure the lateral members 50 within their respective receptacles 54 may then be removed, if used, and the two stands 10 withdrawn laterally from each of the receptacles 54, and stored for further use.

In summary, the above described log trailer support will be seen to provide a significant savings of labor and materials in the transport of logs and other elongate articles using an articulated log trailer. Heretofore, no means was available to hold the hitch plate of such a trailer at the desired height for hitching to a truck tractor, and simultaneously maintaining the proper orientation of the folding hitch end of the articulated trailer for hookup to the tractor. The present invention responds to both of these needs simultaneously, in a pair of stands which may be handled by a single individual. It should also be noted that the present stands lend themselves to scaling up to support the greater weight of a fully laden trailer, if desired, although the additional mass of the stands might preclude handling by a single individual, as provided by the present stands.

It is to be understood that the present invention is not limited to the sole embodiment described above, but encompasses any and all embodiments within the scope of the following claims.

We claim:

1. A log trailer and trailer support therefor, comprising in combination:

an articulated boom with a forward end having a fifth wheel hitch plate hingedly attached thereto, with said hitch plate having a transverse log bunk rigidly affixed thereto, with said log bunk having a left end and an opposing right end;

a left lateral support member receptacle exteriorly affixed to said left end of said log bunk;

a right lateral support member receptacle exteriorly affixed to said right end of said log bunk;

a left stand removably received by said left lateral support member receptacle; and a right stand removably received by said right lateral support member receptacle;

each said stand including a base plate with a support column extending upwardly and perpendicularly therefrom and generally centered on said base plate;

each said support column of each said stand having an upper portion with a support sleeve telescopingly adjustably disposed thereover;

each said support sleeve including a lateral support member fixedly extending horizontally therefrom, whereby;

each said stand is positioned and each said support sleeve is adjusted vertically as required on a respective said support column to engage a respective said horizontal support member adjustably within a respective support member receptacle of said log trailer when hitched to a truck tractor and the truck tractor is unhitched from said log trailer with each said stand providing support for said trailer forward end to support said hitch plate of said trailer clear of the ground.

2. The log trailer and trailer support combination according to claim 1, wherein:

said upper portion of each said support column of each said stand of said trailer support includes a plurality of adjustment holes therethrough adapted to accept a removable pin therethrough, with said pin providing an adjustable height base for each respective said support sleeve of each said stand.

3. The log trailer and trailer support combination according to claim 1, wherein:

each said support column of each said stand includes a lower portion comprising a cylindrical pipe.

4. The log trailer and trailer support combination according to claim 1, wherein:

each said support column includes a lower portion and a seal disposed between said lower portion and said upper portion of each said support column.

5. The log trailer and trailer support combination according to claim 1, wherein:

each said lateral support member includes a solid bar secured to a reinforcement plate, said reinforcement plate being sandwiched between said support member and said support sleeve of each respective said stand.

6. The log trailer and trailer support combination according to claim 1, wherein:

each said lateral support member receptacle includes a slot therein, and;

each said lateral support member of each said stand includes a threaded hole therein aligned with said slot of a respective said receptacle for adjustably and securably engaging each respective said lateral support member of a respective said support stand with each respective said lateral support member receptacle.

7. The log trailer and trailer support combination according to claim 1, including:

flanged inboard and outboard edges on each said base plate of each respective said stand.

8. The log trailer and trailer support combination according to claim 1, including:

reinforcement gussets joining each said base plate to a respective said support column of each said stand.

* * * * *